US010129362B2

(12) United States Patent
Toksoz et al.

(10) Patent No.: US 10,129,362 B2
(45) Date of Patent: Nov. 13, 2018

(54) CACHING SYSTEM

(71) Applicant: Google LLC, Mountain View, CA (US)

(72) Inventors: Tuna Toksoz, Mountain View, CA (US); Thomas Graham Price, San Francisco, CA (US); Anurag Agrawal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 192 days.

(21) Appl. No.: 15/240,876

(22) Filed: Aug. 18, 2016

(65) Prior Publication Data

US 2018/0054498 A1 Feb. 22, 2018

(51) Int. Cl.
G06F 15/173 (2006.01)
H04L 29/08 (2006.01)
G06Q 30/02 (2012.01)

(52) U.S. Cl.
CPC ..... *H04L 67/2847* (2013.01); *G06Q 30/0277* (2013.01); *H04L 67/02* (2013.01); *H04L 67/1097* (2013.01)

(58) Field of Classification Search
USPC ....... 709/206, 226; 705/34; 725/32; 715/716
See application file for complete search history.

(56) References Cited

U.S. PATENT DOCUMENTS

| 7,769,805 | B1 | 8/2010 | Barnes et al. |
| 8,745,257 | B1 | 6/2014 | Karimov et al. |
| 8,812,956 | B1* | 8/2014 | Rosenbaum .......... G06F 3/0484 715/716 |
| 8,838,480 | B2 | 9/2014 | Damola et al. |
| 8,838,488 | B1* | 9/2014 | Breau ................ G06Q 30/0185 705/34 |
| 8,880,652 | B2 | 11/2014 | Lam |
| 9,058,324 | B2 | 6/2015 | Kohlenberg et al. |
| 9,126,018 | B1* | 9/2015 | Garrison .......... A61M 25/0662 |
| 9,143,575 | B2* | 9/2015 | Cao ..................... H04L 67/2842 |
| 9,226,018 | B1 | 12/2015 | Filippov et al. |
| 9,380,332 | B1 | 6/2016 | Mills et al. |
| 2010/0332328 | A1 | 12/2010 | Dharmaji et al. |
| 2011/0153426 | A1 | 6/2011 | Reddy et al. |
| 2014/0282636 | A1 | 9/2014 | Petander et al. |

(Continued)

FOREIGN PATENT DOCUMENTS

WO 2015/095297 6/2015

*Primary Examiner* — Tammy Nguyen
(74) *Attorney, Agent, or Firm* — Fish & Richardson P.C.

(57) ABSTRACT

This document describes a content caching system for pre-loading digital components, the system including a communication interface configured to communicate with a remote device over a wireless network, a local content cache; and an evaluation system comprising one or more processors. The one or more operations include pre-loading a digital component for rendering in a browser at a time that is subsequent to a time of the pre-loading, registering a scheme of a network reference for the cached digital component, with the scheme comprising a specified portion of the network reference for the cached digital component; retrieving, from the local content cache, the pre-loaded digital component associated with the digital component tag comprising the network reference; and rendering, from the local content cache, the pre-loaded digital component in a graphical user interface rather than requesting the digital component from the remote device.

25 Claims, 6 Drawing Sheets

(56) References Cited

U.S. PATENT DOCUMENTS

2015/0063783 A1    3/2015  Berger et al.
2015/0082341 A1*  3/2015  Rosenbaum .......... G06F 3/0484
                                                725/32
2015/0287102 A1*  10/2015  Gupta ................ G06Q 30/0257
                                               705/14.73

* cited by examiner

CACHING SYSTEM

BACKGROUND

Webpages are requested by computing devices and a system responds by sending data to the computing device. If the data includes video data, the video data is downloaded to the computing device during the process of presenting a webpage to the user of the computing device.

SUMMARY

This document describes a content caching system that includes a communication interface configured to communicate with a remote device over a wireless network; a local content cache; and an evaluation system including one or more processors. The one or more processors are configured to perform operations including, responsive to detecting an occurrence of a predefined state for caching content, pre-loading a digital component (e.g., a video) for rendering in a browser at a time that is subsequent to a time of the pre-loading, with the pre-loading including: requesting the digital component from the remote device; receiving the digital component; and caching the digital component in the local content cache; registering a scheme of a network reference for the cached digital component, with the scheme comprising a specified portion of the network reference for the cached digital component; responsive to receiving a digital component tag comprising a network reference comprising a portion corresponding to the registered scheme: retrieving, from the local content cache, the pre-loaded digital component associated with the digital component tag comprising the network reference; and rendering, from the local content cache, the pre-loaded digital component in a graphical user interface rather than requesting the digital component from the remote device.

In some implementations, the scheme of the network reference specifies that the network reference is associated with an application on the content caching system and identifies the application as being configured to respond to a request for the pre-loaded digital component. The graphical user interface includes a webpage, and wherein the operations further include: receiving webpage data from a publisher system, the webpage data comprising a digital component tag for a digital component slot of the webpage; in response to receiving the webpage data, requesting, from an evaluation system, a network reference for loading into the digital component tag to identify a digital component with which to populate the digital component slot of the webpage; and receiving, from the evaluation system, the network reference for loading into the digital component tag, the network reference comprising a portion corresponding to the registered scheme.

In some implementations, receiving the network reference for loading into the digital component tag includes receiving a first network reference comprising a uniform resource locator (URL) designating the remote device from which to load the digital component; and receiving a second network reference comprising a portion of the network reference corresponding to the registered scheme. In some implementations, the evaluation system can perform operations including, responsive to receiving another digital component tag comprising another network reference, determining that the other network reference does not satisfy the network reference scheme; determining whether another digital component associated with the other network reference is stored in the local content cache by comparing the other network reference to a list of known network references; and in response to a determination that the other digital component is stored at the local content cache, retrieving, from the local content cache, the other digital component associated with the other network reference.

In some implementations, the digital component is rendered from video data, and wherein pre-loading the digital component from the remote device comprises downloading the video data from the remote device. The predefined state includes a determination that the wireless network is a local area network (LAN).

This document describes a method that includes steps such as, following the first responsive to detecting an occurrence of a predefined state for caching content, pre-loading a digital component for rendering in a browser at a time that is subsequent to a time of the pre-loading, with the pre-loading comprising: requesting the digital component from the remote device; receiving the digital component; and caching the digital component in a local content cache; registering a scheme of a network reference for the cached digital component, with the scheme comprising a specified portion of the network reference for the cached digital component; responsive to receiving a digital component tag comprising a network reference comprising a portion corresponding to the registered scheme: retrieving, from the local content cache, the pre-loaded digital component associated with the digital component tag comprising the network reference; and rendering, from the local content cache, the pre-loaded digital component in a graphical user interface rather than requesting the digital component from the remote device.

In some implementations, the scheme of the network reference specifies that the network reference is associated with an application on the content caching system and identifies the application as being configured to respond to a request for the pre-loaded digital component. In some implementations, the graphical user interface includes a webpage, and steps further include receiving webpage data from a publisher system, the webpage data comprising a digital component tag for a digital component slot of the webpage; in response to receiving the webpage data, requesting, from an evaluation system, a network reference for loading into the digital component tag to identify a digital component with which to populate the digital component slot of the webpage; and receiving, from the evaluation system, the network reference for loading into the digital component tag, the network reference comprising a portion corresponding to the registered scheme.

In some implementations, receiving the network reference for loading into the digital component tag includes receiving a first network reference comprising a uniform resource locator (URL) designating the remote device from which to load the digital component; and receiving a second network reference comprising a portion of the network reference corresponding to the registered scheme. In some implementations, responsive to receiving another digital component tag comprising another network reference, determining that the other network reference does not satisfy the network reference scheme; determining whether another digital component associated with the other network reference is stored in the local content cache by comparing the other network reference to a list of known network references; and in response to a determination that the other digital component is stored at the local content cache, retrieving, from the local content cache, the other digital component associated with the other network reference. The digital component is rendered from video data, and wherein pre-loading the digital component from the remote device comprises downloading the video data from the remote device. The predefined state comprises a determination that the wireless network is a local area network (LAN).

This document describes one or more non-transitory machine-readable media comprising instructions that are executable to perform operations including, responsive to detecting an occurrence of a predefined state for caching content, pre-loading a digital component for rendering in a browser at a time that is subsequent to a time of the pre-loading, with the pre-loading including requesting the digital component from the remote device; receiving the digital component; and caching the digital component in a local content cache; registering a scheme of a network reference for the cached digital component, with the scheme comprising a specified portion of the network reference for the cached digital component; responsive to receiving a digital component tag comprising a network reference comprising a portion corresponding to the registered scheme: retrieving, from the local content cache, the pre-loaded digital component associated with the digital component tag comprising the network reference; and rendering, from the local content cache, the pre-loaded digital component in a graphical user interface rather than requesting the digital component from the remote device. In some implementations, the scheme of the network reference specifies that the network reference is associated with an application on the content caching system and identifies the application as being configured to respond to a request for the pre-loaded digital component.

In some implementations, the graphical user interface includes a webpage, and the computer readable media are further configured to perform operations including receiving webpage data from a publisher system, the webpage data comprising a digital component tag for a digital component slot of the webpage; in response to receiving the webpage data, requesting, from an evaluation system, a network reference for loading into the digital component tag to identify a digital component with which to populate the digital component slot of the webpage; and receiving, from the evaluation system, the network reference for loading into the digital component tag, the network reference comprising a portion corresponding to the registered scheme. In some implementations, receiving the network reference for loading into the digital component tag includes receiving a first network reference comprising a uniform resource locator (URL) designating the remote device from which to load the digital component; and receiving a second network reference comprising a portion of the network reference corresponding to the registered scheme.

In some implementations, the computer readable media are further configured to perform operations including, responsive to receiving another digital component tag comprising another network reference, determining that the other network reference does not satisfy the network reference scheme; determining whether another digital component associated with the other network reference is stored in the local content cache by comparing the other network reference to a list of known network references; and in response to a determination that the other digital component is stored at the local content cache, retrieving, from the local content cache, the other digital component associated with the other network reference. The digital component is rendered from video data, and wherein pre-loading the digital component from the remote device comprises downloading the video data from the remote device. In some implementations, the predefined state comprises a determination that the wireless network is a local area network (LAN).

This document additionally describes a communication interface configured to communicate with a remote device over a wireless network; a local content cache; and means for pre-loading a digital component for rendering in a browser at a time that is subsequent to a time of the pre-loading, responsive to detecting an occurrence of a predefined state for caching content, with the pre-loading comprising: means for requesting the digital component from the remote device; means for receiving the digital component; and means for caching the digital component in a local content cache; means for registering a scheme of a network reference for the cached digital component, with the scheme comprising a specified portion of the network reference for the cached digital component; responsive to receiving a digital component tag comprising a network reference comprising a portion corresponding to the registered scheme: means for retrieving, from the local content cache, the pre-loaded digital component associated with the digital component tag comprising the network reference; and means for rendering, from the local content cache, the pre-loaded digital component in a graphical user interface rather than requesting the digital component from the remote device.

An advantage of the content caching system is that pre-loading (e.g., downloading from the remote system) digital component data (including, e.g., video clip data, audio clip data, image data, text data, or a combination thereof)) can reduce a latency of rendering a digital component (including e.g., a video clip, an audio clip, an image, text, or a combination thereof) represented by the digital component data relative to a latency introduced from downloading the digital component from the remote system in response to the request for the digital component received in the webpage data. The digital component data can thus be presented to the user almost immediately in response to the request and with less use of network resources at the time of the request relative to the use of network resources required to download the digital component from the remote system at the time of the request.

The details of one or more embodiments are set forth in the accompanying drawings and the description below. Other features, objects, and advantages of the techniques described herein will be apparent from the description and drawings, and from the claims.

DESCRIPTION OF DRAWINGS

Like reference symbols in the various drawings indicate like elements.

DETAILED DESCRIPTION

This document describes a system for caching content to a computing device for presentation with a webpage. Typically, when a client device requests webpage content from a publisher system (e.g., a server for a website), several processes are initiated in response to the request. These processes, which are used to assemble the webpage that is served to the client device, can include one or more requests made to various systems connected by the Internet and computations by the various systems, and generate latency in rendering the webpage. If video data (for rendering a video in the webpage) is requested along with other webpage data (e.g., webpage content) of the webpage, rendering of the video represented by that video data can be delayed relative to rendering the rest of the webpage, as the video data requires more time to download (e.g., from a remote system), relative to download times for data representing other portions of the webpage. This delay (e.g., a latency) can cause the video to begin playing after other content has been loaded and after a user has lost interest in viewing the video, such as after a user has scrolled down the webpage away from the embedded video player. The content caching system pre-loads (e.g., downloads from the remote system) digital component data (including, e.g., video clip data, audio clip data, image data, text data, or a combination thereof)) of the webpage so that a latency of rendering a digital component (including e.g., a video clip, an audio clip, an image, text, or a combination thereof) represented by the digital component data is reduced relative to a latency introduced from downloading the digital component from the remote system in response to the request for the digital component received in the webpage data.

Figure 1:
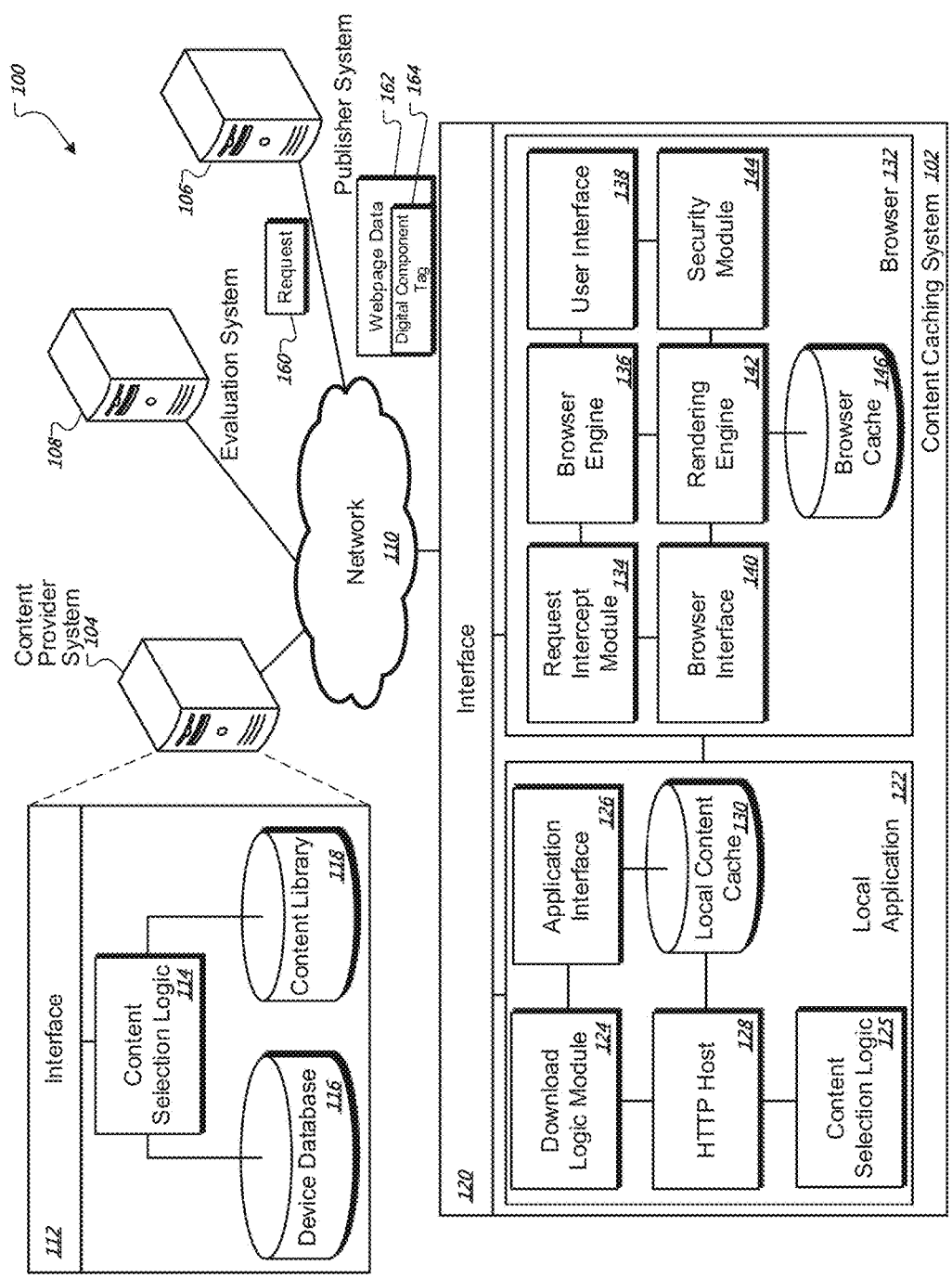
FIG. 1 is a block diagram of a networked environment for a content caching system.

Referring to FIG. 1, networked environment 100 includes a content caching system 102 that communicates with an evaluation system 108 (e.g., an auction platform), a publisher system 106, and a content provider system 104. The content caching system 102 sends a request 162 to the publisher system 106 for webpage data and receives the webpage data in response to the request. The publisher system 106 receives the request from the content caching system 102 and responds by transmitting the webpage data 162 to the content caching system 102. Webpage data 162 represents a content slot in a webpage. Webpage data 162 also includes a digital component tag 164 (e.g., an HTML tag). Generally, a digital component tag includes a string of characters representing a signal to a rendering engine 142 of a browser 132 that special content (e.g., a digital component) should be requested for that digital component tag from another resource specified in the digital component tag (e.g., using a network reference). The content caching system 102 sends a request to the content provider system 104 for data including a digital component and receives the data representing the digital component from the content provider system 104. The content provider system 104 receives the request from the content caching system 102, retrieves the requested content from a content library 118, and responds to the content caching system 102 with the data including the requested digital component. In response to receiving webpage data and digital component tag, the content caching system 102 sends a request to an evaluation system 108 for evaluation data (e.g., network references to one or more digital components) and receives data including the digital component tag loaded with a network reference (e.g., a URL) specifying the digital component for a content slot of the webpage in response. A network 110 can be a wireless network, such as a cellular network. The network 110 can include Internet infrastructure.

The content caching system 102 includes a communication interface 120 that sends out requests of the content caching system 102 over the network 110 to one or more other systems and that receives requests or responses from the other systems over the network 110. The communication interface 120 communicates with a local application 122 of the content caching system 102 and a browser 132 of the content caching system 102.

The content caching system 102 includes a local application 122 that handles the caching functionality of the content caching system 102. The local application 122 includes a download logic module 124 that determines when to send a request to the content provider system 104 and initiate the download of a digital component from the content provider system 104. The local application 122 includes an application interface 126 that receives requests from other applications, such as the browser 132, for cached digital components. The local application 122 includes a local content cache 130. The local content cache 130 stores the digital components that have been retrieved from the content provider system 104. The local application 122 includes an HTTP host 128 that responds to requests for particular HTTP network references (e.g., URLs). In some implementations, the local application 122 is an application service layer that supports multiple presentation layers such as web, mobile, etc. In some implementations, the local application 122 includes content selection logic 125 for determining which digital component(s) to request from the content provider system 104. In some implementations the HTTP host is another form of local host, or any system that handles requests for resources through a call-and-response API.

The local application 122 interface provides a resource for the browser 132 and for websites that have been loaded by the browser 132 to interact with the local application 122 and retrieve cached digital components when required. The application interface 126 responds to content requests from the browser 132 for digital components. The application interface 126 queries the local content cache 130 for the digital component(s) requested by the browser 132. If the digital component being requested is in the cache and is thus a pre-loaded digital component, the application interface 126 retrieves the pre-loaded digital component and sends a response to the browser 132 including the pre-loaded digital component data.

In some implementations, the content request includes a digital component tag. The digital component tag specifies which digital component is being requested using a network reference to the digital component. In some implementations, the application interface 126 registers a network reference scheme. The network reference scheme represents a portion (e.g., a protocol or scheme) of the network reference for pre-loaded digital components stored in the local content cache 130 of the local application 122. The network reference scheme indicates to the browser 132 that the pre-loaded digital component could be available in the local content cache 130 of the local application 122 and that the local application 122 should be queried for the digital component before a request is sent to the content provider system 104 for the digital component. The network reference scheme is registered by the application interface 126 of the local application 122 with the browser 132 and recognized by the application interface 126 when received in a request by the browser 132. In some implementations, when a request including a digital component tag that includes the network reference satisfying the network reference scheme is received, the application interface 126 sends a request to the local content cache 130 for the digital component. In some implementations, when a request including a network reference that does not satisfy the network reference scheme is received, the application interface 126 sends a request to the HTTP host 128 of the local application 122 for retrieval of the digital component. In some implementations, when a request including a network reference that does not satisfy the network reference scheme is received, the application interface 126 sends a request to the content provider system 104 for retrieval of the digital component.

The content selection logic 125 of the local application 122 includes one or more algorithms that determine which digital components to request from the content provider system 104 and preload into the local content cache 130. The content selection logic 125 selects digital components (e.g., videos) that are likely to be requested by the browser 132 for populating a digital component slot of a webpage, such as digital components that are relevant to a user of the content caching system 102 or digital components that are likely to be selected in an evaluation for webpages requested by the content caching system 102. In some implementations, the content selection logic 125 of the local application 122 communicates with a server—and the server uses machine learning to determine which digital components should be selected for pre-loading to the content caching system 102. In some implementations, the digital components have specific targeting parameters (e.g., serving parameters), and the content selection logic 125 can select all or a subset of the digital components that satisfy the specific targeting parameters for pre-loading to the content caching system 102.

In some implementations, the content selection logic 125 uses metadata gathered from other applications and systems, such as the browser 132. In some implementations, if the content caching system 102 is installed on a computing platform (e.g., a mobile device), the content caching system 102 can use the sensors and other features of the computing platform to gather information about a user of the content caching system 102 and determine which digital components are most likely to be requested for the user. In some implementations, the content selection logic 125 targets digital components for selection using historical user geographical information, user demographics, user browsing history, user click history, local time of day, current geographical location, proximity to one or more institutions represented in available digital components, calendar information, and so forth. In some implementations, the digital component is a video advertisement, such as an advertisement for a restaurant. When the content caching system 102 detects that the restaurant is within a predetermined proximity, the content selection logic 125 targets the digital component for pre-loading. In some implementations, the content selection logic 125 gathers data indicating that the user of the content caching system 102 intends to visit a trade show. The content selection logic 125 targets digital components produced by vendors of the trade show. Other such implementations of targeting logic by the content selection logic 125 are possible. In some implementations, the content provider system 104 includes the content selection logic 125.

The download logic module 124 of the local application 122 controls when digital component data will be pre-loaded (e.g., downloaded) into the local application 122 from the content provider system 104. The download logic module 124 monitors the status of the content caching system 102 and determines a suitable circumstance in which to pre-load digital components to the local content cache 130 or update the local content cache 130 with new digital components. In some implementations, the download logic module 124 recognizes a predefined state (e.g., trigger state, download state, etc.), of the content caching system 102 and sends a request to the content provider system 104 to pre-load the digital component to the local content cache 130. In some implementations, determining the predefined state includes recognizing that the network 110 used by the content caching system 102 a WiFi network rather than a cellular network. In some implementations, the content caching system 102 is a mobile computing device, and determining the predefined state includes determining that the content caching system 102 is receiving power from an external power source, such as a battery charger or wall outlet. As such, in some implementations, the download logic module 124 monitors the status of the content caching system 102 to opportunistically pre-load digital components such that use of one or more limited resources of the content caching system 102, such as a battery life and network data usage (when applicable), are minimized by the content caching system 102. In some implementations, the download logic module 124 may prompt a user of the content caching system 102 for permission to request the digital component from the content provider system 104. In some implementations, the download logic module 124 runs in the background of the content caching system 102 and does not prompt the user before pre-loading the digital component. In some implementations, the download logic module 124 monitors the geographic location of the content caching system 102 and pre-loads a digital component based on the detected location. Other statutes of the content caching system 102 in which the download logic module 124 requests the digital component from the content provider system 104 based on data collected about the content caching system 102 are possible.

The local content cache 130 of the local application 122 includes a database of pre-loaded digital components of the local application 122. The cache size of the local content cache 130 is set by the local application 122. In some implementations, the cache size of the local content cache 130 is increased or decreased depending on one or more factors such as the browsing behavior of the user of the content caching system 102, the file size of the digital components recommended for storage by the content selection logic 125, and the number of digital components recommended for storage by the content selection logic 125. In some implementations, if the content selection logic 125 targets particular digital components to be pre-loaded, the cache size can depend on the size and number of targeted digital components. In some implementations, the cache size can determine the number or selection of digital components to be pre-loaded by the local application 122. In some implementations, the local content cache 130 stores video digital components.

In some implementations, the content caching system 102 includes an HTTP host 128 or a similar service for handling calls to particular network references (e.g., URLs). The application interface 126 receives a request from the browser 132 having a particular network reference, such as a network reference to a predetermined resource. The local application 122 handles the request for the predetermined resource (e.g., an HTTP request).

The content caching system 102 includes a browser 132. The browser 132 is an application that requests and presents webpage data for the content caching system 102. The browser 132 sends requests for data from the publisher system 106 and renders the response data from the publisher system 106, such as webpage data, using a user interface 138. The browser 132 includes a browser engine 136 that queries and manipulates a rendering engine 142 and controls dataflow in the browser 132.

The browser 132 includes a rendering engine 142 that generates (e.g., renders) the webpage for presentation by the browser's user interface 138. The rendering engine 142 is responsible for displaying the requested content. The rendering engine 142 parses the received webpage data. In some implementations, the rendering engine 142 parses the CSS or HTML. In some implementations, the rendering engine 142 includes a script interpreter (e.g., a Javascript interpreter). The rendering engine 142 identifies network references that are included in the received webpage data, such as a network reference in a digital component tag. In some implementations, the rendering engine 142 sends the identified network reference (e.g., network references included in digital component tags) to the request intercept module 134 for determining if the network reference satisfies a registered network reference scheme.

The browser 132 has a security module 144. The security module 144 prevents websites from accessing resources on the content caching system 102, such as services of other applications of the content caching system 102, from the browser 132. In some implementations, the security module 144 prevents malicious software from being downloaded when a link is selected by the user that could access data from other applications on the content caching system 102. The request intercept module 134 recognizes the registered network references and allows a request to be sent to the local application 122 without violating the security model of the security module 144. In some implementations, when an operating system of the content caching system 102 does not allow a webpage to request resources from other applications, the request intercept module 134 of the browser 132 is permitted to request resources from the local application 122 because it is recognized by the operating system as being a native application to the content caching system 102.

The request intercept module 134 of the browser 132 analyses network calls received by the browser 132, such as in the received webpage data, and determines if the request should be routed to the remote system, such as the content provider system 104 or the publisher system 106, or if the request should be routed to a local program, such as the local application 122. In some implementations, the request intercept module 134 can be installed as an add-on to standard commercial browsing software. In some implementations, the request intercept module 134 can be part of a networking module of the browser 132 used for other network calls, such as HTTP requests.

In some implementations, the request intercept module 134 analyzes a network reference, such as a URL or other network call, that has been identified by the rendering engine 142 after parsing the webpage data. The request intercept module 134 accesses a registry of stored network reference schemes (e.g., a registry stored in the browser cache 146) and compares the received network reference to the registered network reference schemes to determine if the received network reference satisfies any of the registered network reference schemes. If the received network reference satisfies one of the network reference schemes, a request for the digital component including the received network reference is sent to the application (e.g., the local application 122) that registered the network reference scheme. In some implementations, a number of applications of the content caching system 102 are each associated with different network reference schemes registered with the browser 132. The request intercept module 134 uses the portion (e.g., protocol or scheme) of the received network reference to distinguish which of the registered network reference schemes the received network reference satisfies and which application of the number of applications will handle the network call.

The request intercept module 134 communicates with the local application 122 using a browser interface 140. The browser interface 140 handles requests from the local application 122 to the browser 132 and configures requests sent from the browser 132 to the local application 122. When data is received from the local application 122 (e.g., a response to a request from the browser 132 for digital component data), the browser interface 140 receives the data and routes the data to the appropriate module or subsystem of the browser 132. In some implementations, the browser interface 140 includes buffers, registers, and other hardware or software needed to send and receive data from one or more other applications of the content caching system 102, such as the local application 122.

The network reference scheme includes a particular portion (e.g., protocol or scheme) of the network reference and is registered by an application (e.g., local application 122) on the content caching system 102. The scheme of the network reference indicates which application registered the network reference scheme with the content caching system 102. In some implementations, the particular portion that is identified by the request intercept module 134 is the scheme of a URL or other uniform resource identifier (URI). The scheme is altered from the scheme of a standard network reference (e.g., "HTTP" in a URL) to instead refer to a particular application. The altered scheme is registered by the local application 122 to the content caching system 102 (e.g., to the browser 132). In some implementations, the scheme of the network reference determines which application will be sent a request of for the digital component. Examples of a generic URI syntax and particular formats are found in Table 1, below. Table 1 shows possible implementations of the network reference scheme. An example URI is shown to illustrate the syntax of the URI and to show the context of the scheme of a network reference.

TABLE 1

URI Syntax
scheme://user:password@host:port/path?query#fragment

| Scheme Implementations | Corresponding Applications |
| --- | --- |
| videoprovider:// | Local application 122 |
| marketplace:// | Online Marketplace Application |
| socialnetwork:// | Social Networking Application |

In the above implementation, the scheme of the network reference is used to identify the network reference as being registered to an application (e.g., the local application 122) of the content caching system 102; however, other registration protocols can be used for this purpose. In some implementations, portions of the network reference (e.g., a URL) other than the scheme include a particular portion of the network reference that is recognized by the request intercept module 134, such as the host, user, or other portion. In some implementations, the network reference uses an HTTP scheme with a particular HTTP address that is recognized by the request intercept module 134, and the local application 122 includes an HTTP host 128 for handling such requests. In some implementations, the network reference scheme uses other protocols besides formatted URLs or URIs and includes a portion of the network reference for the other protocol that is registered with the content caching system 102 and recognized by the local application 122 of the content caching system 102.

The browser 132 includes a browser cache 146. The browser cache 146 is used for persistence data associated with received webpages. In some implementations, the browser cache 146 stores a registry of network reference schemes. When the browser 132 receives a network reference from a webpage, such as in a digital component tag, the request intercept module 134 identifies the network reference and queries the browser cache 146 to determine if the network reference satisfies a registered network reference scheme. In some implementations, the request intercept module 134 stores the registry of the registered network reference schemes in a separate cache. In some implementations, the browser cache 146 does not have enough storage space to store digital components, such as video digital components for a webpage. In such an implementation, the digital components for the webpage are stored in the local content cache 130 of the local application 122.

The browser 132 includes a user interface 138, such as a graphical user interface (GUI) 138. The rendering engine 142 generates the webpage for presentation in the user interface 138 of the browser 132. The user interface 138 includes one or more controls (e.g., buttons, sliders, etc.) for requesting and sending data over the network. When a digital component is selected and retrieved from the local application 122, the rendering engine 142 assembles the digital component and the webpage for presentation using the user interface 138.

The networked environment 100 includes the content provider system 104. The content provider system 104 is a computing device (e.g., a server or servers) that host digital components and send one or more digital components in response to a request for the one or more digital components by another computing device (e.g., the content caching system 102). The content provider system 104 includes an interface 112 for communicating with other systems of the networked system 100.

In some implementations, the content provider system 104 includes a content library 118 of the digital components, such as an indexed database of digital components. The digital components of the content library 118 can be associated with additional data that classifies the digital component, such as a topic, keyword, category, or other data. In some implementations, the content provider system 104 receives a request from a device for a digital component and responds by serving the digital component to the requesting device. In some implementations, the content provider system 104 receives a request for one or more digital components based on a category or other of the additional data that classifies the digital components. In some implementations, the content provider system 104 responds with all the digital components related to the requested category.

In some implementations, the content provider system 104 uses content selection logic 114 to determine which digital component would be most relevant to the requesting device. In some implementations, the content selection logic 114 uses device data or user profile data stored in a device database 116 to select the relevant digital component. In some implementations, the content selection logic 114 of the content provider system 104 can use similar machine learning algorithms as the local application 122 to select the relevant digital component. In some implementations, the content provider system 104 uses user profile information, associated with a user, that is stored in the device database 116 to select one or more digital components for each device (e.g., content caching system 102) associated with the user. In some implementations, the content provider system 104 can queue the digital components selected for the user by storing references to the digital components in the user profile on the device database 116. When a request is received by a device of the user, the content provider system 104 can send the queued digital components to the device. In such an implementation, the content provider system 104 determines which digital components are relevant to the user and pushes the selected digital components to each device of the user when each device requests digital components from the content provider system 104. Queueing the digital components in advance can prepare the content provider system 104 to send relevant digital components to the content caching system 102, even if the content caching system 102 is in a predefined state (e.g., trigger state, download state, etc.) for a short period of time and helps to ensure that the content caching system 102 has relevant digital components stored in the local content cache 130.

The networked environment 100 can include an evaluation system 108. In response to receiving webpage data including a content slot with a digital component tag (e.g., an HTML tag), the content caching system 102 sends a request to an evaluation system 108 for evaluation data and receives data including the digital component tag loaded with a network reference (e.g., a URL) specifying digital component for a content slot of the webpage in response. The evaluation data includes a digital component tag specifying a network reference (e.g., a URL link) that indicates which a digital component should be retrieved from the content provider system 104. The evaluation system 108 generates the evaluation data by performing an evaluation process (e.g., running an auction process) for a digital component slot represented by the digital component tag received from the content caching system 102 and sends the evaluation data including the digital component tag loaded with the network reference to the content caching system 102. In some implementations, the evaluation system 108 loads the digital component tag with a first network reference and a second network reference. The first network reference includes a network reference satisfying a registered network reference scheme of the local application 122. The second network reference includes a URL link, such as an HTTP link, for requesting a digital component from a remote system. The first network reference requests the digital component from the local application 122. The second network reference request the digital component from a remote system, such as the content provider system 104, as a backup or fallback in the case where the local application 122 does not or cannot respond to the request for the digital component.

The networked environment 100 can include a publisher system 106. The publisher system 106 includes a remote computing device (e.g., a server or servers) that responds to requests for webpage data from the content caching system 102 by sending the webpage data. The webpage data includes publisher content and digital component slots. The digital component slots include digital component tags (e.g., HTML tags) that indicate that a digital component is to be requested and used to populate the digital component slot. The digital component tag includes data that is sent to the evaluation system 108 for initiating and running an evaluation for the webpage including the digital component slot. In some implementations, the publisher system 106 includes a website server or similar system.

Figure 2:
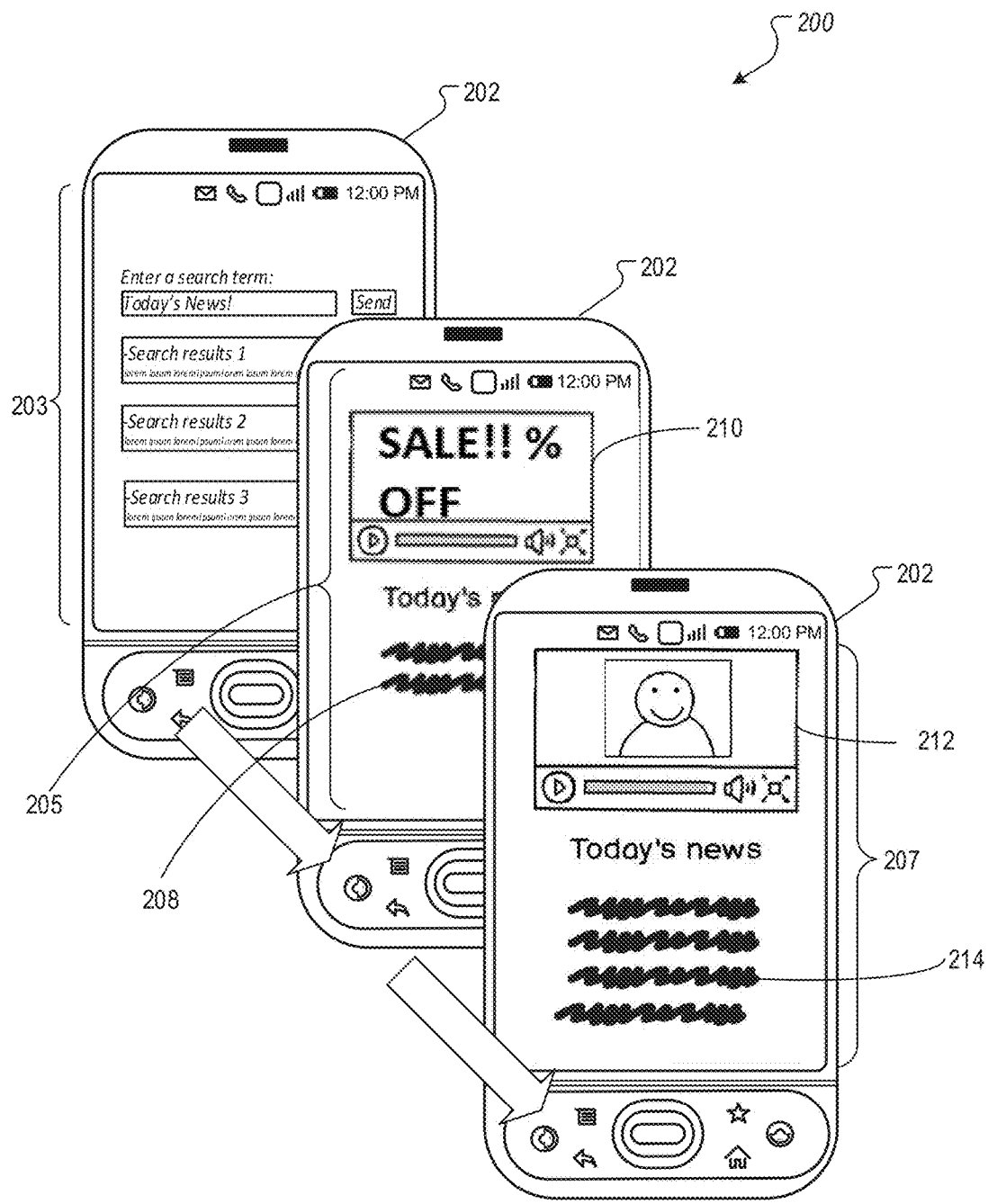
FIG. 2 is a conceptual diagram of a content caching system.

Referring to FIG. 2, a conceptual diagram 200 shows an example application of a content caching system. In this application, the content caching system is part of (e.g., embedded in) a mobile device 202, such as, e.g., a mobile phone. The content caching system of the mobile device 202 monitors the status of the mobile device 202 to determine if the mobile device 202 has entered a predetermined state.

The predetermined state of the mobile device 202 includes a state where digital components can be pre-loaded onto the content caching system of the mobile device 202. In some implementations, the predetermined state occurs when the mobile device 202 is attached to an external power source, such as when a battery of the mobile device 202 is being recharged. In some implementations, detecting the predetermined state of the mobile device 202 includes detecting that the mobile device 202 is communicating using a WiFi network, rather than a cellular network. In some implementations, the predetermined state is chosen based on saving resources of the mobile device 202, such as reducing bandwidth consumption or reducing power consumption when the mobile device is using battery power. By restricting pre-loading of digital components to the predetermined state, use of resources such as battery power and data usage is reduced for operation of the mobile device 202, relative to pre-loading digital components during another state of the mobile device 202 (e.g., a state occurring at another time) or relative to loading the digital component when requested by a webpage.

In response to detecting that the predetermined state is satisfied by the mobile device 202, content caching system sends a request to the content provider system (e.g., content provider system 104) for one or more digital components. As described above, various algorithms determine which digital components stored by the content provider system are relevant to the user of the mobile device 202 or are most likely to be chosen in an evaluation for a content slot of a webpage requested by the mobile device 202. The content caching system pre-loads one or more digital components. The content caching system pre-loads the one or more digital components by receiving the one or more digital components in response to the request and caching the one or more digital components in a local content cache, such as such as local content cache 130, of a local application (e.g., local application 102).

The local application of the mobile device 202 registers a network reference scheme with the browser (e.g., browser 132) of the mobile system 202. Remote devices, such as publisher systems, are configured to request digital components using the network reference scheme registered by the local application. In some implementations, the local application is associated with the publisher system, such as a social networking application installed on mobile device 102. When the website of the publisher system is requested, the content slots (e.g., ad slots) of the webpage are associated with digital component tags (e.g., HTML tags) that have network references that satisfy the registered network reference scheme. In some implementations, the digital component tag includes data requesting an evaluation by an evaluation system (e.g., evaluation system 108), and the digital component tag includes data to instruct the evaluation system to load the digital component tag with a network reference that satisfies the registered network reference scheme. In some implementations, more than one local application has a network reference scheme registered with the content caching system.

Mobile device 202 renders GUI 203. When a webpage is requested by mobile device 202, the publisher system responds with the webpage data including one or more digital component tags. If an evaluation is necessary, a request is sent to an evaluation system (e.g., evaluation system 108) and the evaluation system performs the evaluation process. The evaluation system responds by sending digital component tags loaded with network references. In some implementations, the evaluation system loads the digital component tags with a first network reference to the digital component that satisfies the registered network reference scheme and a second network reference to the digital component that includes an HTTP reference. In some implementations, the HTTP reference is a backup link or fallback link for the digital component in case the digital component is not available in the local content cache.

The mobile device 202 receives the digital component tag containing the network reference. The network reference is checked to determine if the network reference satisfies a registered network reference scheme of one or more local applications. If the received network reference satisfies a registered network reference scheme, the content caching system searches the local content cache (e.g., local content cache 122) for the digital component associated with the received network reference. If the digital component is found (e.g., a cache-hit), the local application sends the digital component to the browser for populating the content slot and rendering of the webpage. In some implementations, if the digital component is not available (e.g., cache-miss), the content caching system requests the digital component from a content provider system (e.g., content provider system 104) using the fallback link.

If the digital component is found in the local content cache, the digital component is rendered in the webpage and presented to the user of the mobile device at approximately the same time as the rest of the webpage data. In some implementations, the digital component is a video. The digital component is loaded more quickly from the local application than from a remote system because the digital component has already been downloaded over the network by the content caching system. Loading digital components (e.g., video content) over the network introduces a latency equivalent to the time needed to download the video content to the mobile device 202, render it, and present it to the user. When the digital component is pre-loaded, the latency is reduced relative to retrieving the digital component from the remote device at a time when the webpage is being rendered. Caching the digital component in the local content cache 130 results in increased processing speed for content caching system 102 because the rendering engine accesses the digital component more quickly from the local content cache than from the remote system and can complete assembly operations without idle time introduced by waiting for the digital component. In some implementations, reducing the latency includes reducing the delay between displaying the digital component and the other webpage data to less than 500 ms. Fetching the digital component from the cache and transmitting the digital component data from the local application to the browser takes less time because data transfer rates between the local application and the browser are much faster than data transfer over the network from the local device. Furthermore, data usage is reduced since the digital component need not be downloaded using a cellular network. The digital component, when containing video data, can begin playing immediately or nearly immediately when the webpage is rendered and presented to the user without the latency that would occur by downloading the digital component from the remote device in response to receiving the evaluation data.

Mobile device 202 renders GUI. The screenshot 205 includes a digital component video 110 playing before the mobile device 202 has completed loading the publisher content 208 onto the GUI. The digital component is presented to the user with the rest of the webpage content without significant delay relative to the rest of the webpage content.

Mobile device 206 renders graphical user interface (GUI) 207. The screenshot 207 shows the completion of loading the webpage data onto the GUI. As publisher content 214 has finished loading, digital component 212 has already begun playing and is at a subsequent frame of the digital component from the digital component 210 in screenshot 205. As such, the content caching system helps prepare digital components to be displayed without delay relative to the rest of the webpage data and avoid the latency introduced by video digital components that occurs when the digital component is downloaded from the remote system upon request by the webpage data.

Figure 3:
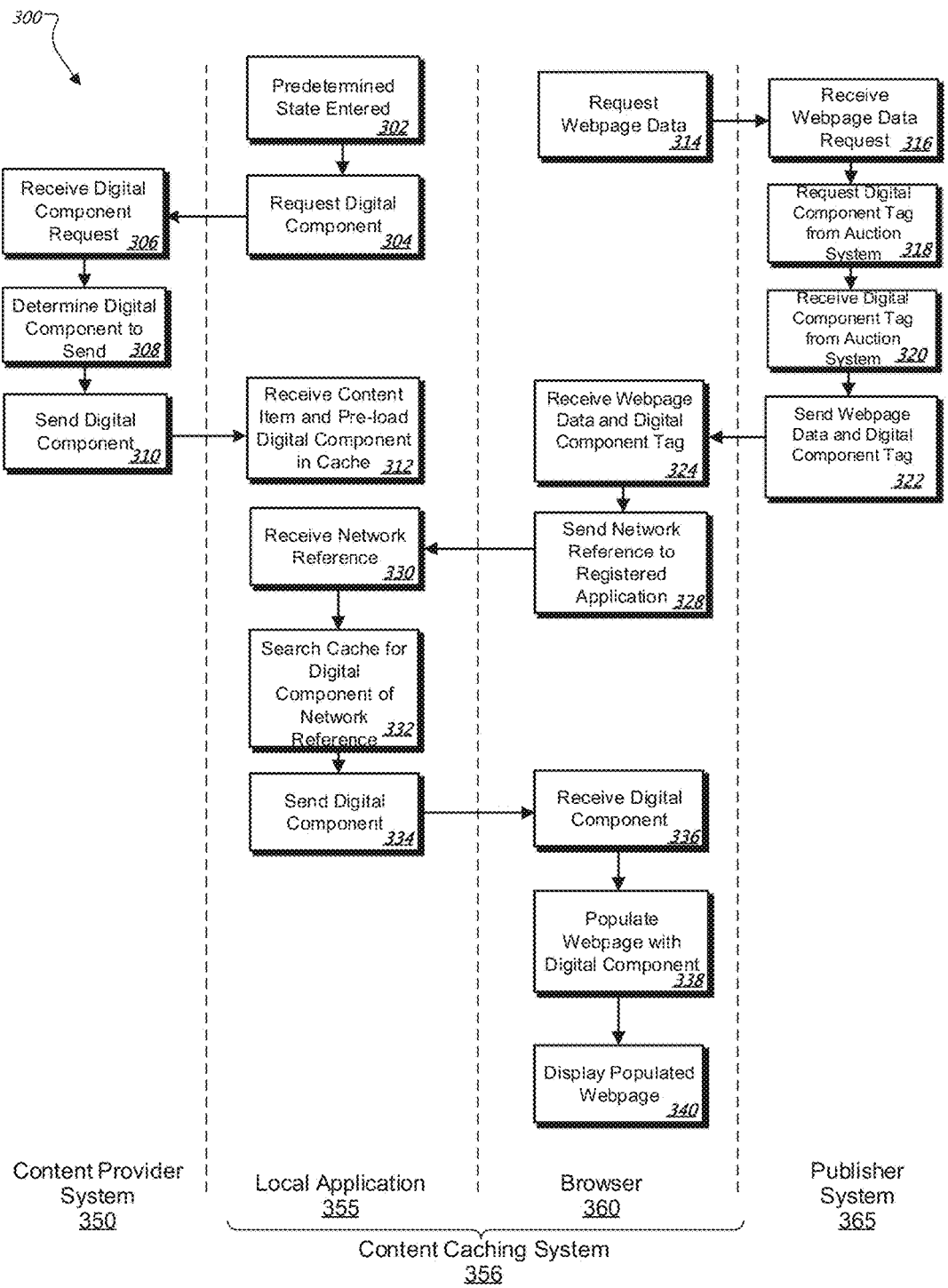
FIGS. 3-5 are flowcharts showing actions taken for caching content.

Referring to FIG. 3, diagram 300 shows example actions (and/or processes) performed in caching content by each of a local application 355 (e.g., local application 122) of content caching system 356, a browser 360 (e.g., browser 132) of content caching system 356, a content provider system 350 (e.g., content provider system 104), and a publisher system 365 (e.g., publisher system 106). In the example shown by diagram 300, the local application 355 enters (302) a download state. The local application 355 requests (304) digital component data (e.g., video data). The content provider system 350 receives (306) the request for the digital component data and determines (308) which digital component data to send. The content provider system 350 sends (310) the determined digital component data. The local application 355 receives the digital component data and stores the digital component data in a cache, such as local content cache 130.

The browser 360 receives (312) a request for webpage data, such a search query by a user of the content caching system (e.g., content caching system 102), a click on a search result link by the user of the content caching system, and so forth. The browser 360 requests (314) the webpage data from the publisher system 365 associated with the request. The publisher system 365 receives (316) the request. For any content slots associated with the requested webpage data, the publisher system 365 requests (318) a digital component tag, such as an HTML tag, to be populated with a network reference (e.g., URL link) by the evaluation system (e.g., evaluation system 108). The evaluation system responds by sending the digital component tag populated with the network reference. The publisher system 365 receives (320) the digital component tag data from the evaluation system and sends (322) the webpage data, including the digital component tag data, to the browser 360. The browser 360 receives (324) the webpage data and the digital component tag data and sends (328) the network reference of the digital component tag to the registered application, such as local application 355. The local application receives (330) the network reference of the digital component tag and searches (332) the cache (e.g., local content cache 130) for the digital component data. The digital component data is sent (334) to the browser 360 by the local application 355. The browser 360 receives (336) the digital component data and populates (338) the content slot associated with the digital component tag data using the received digital component data. The webpage data is displayed (340) by the browser 360 in a graphical user interface (e.g., user interface 138).

Figure 4:
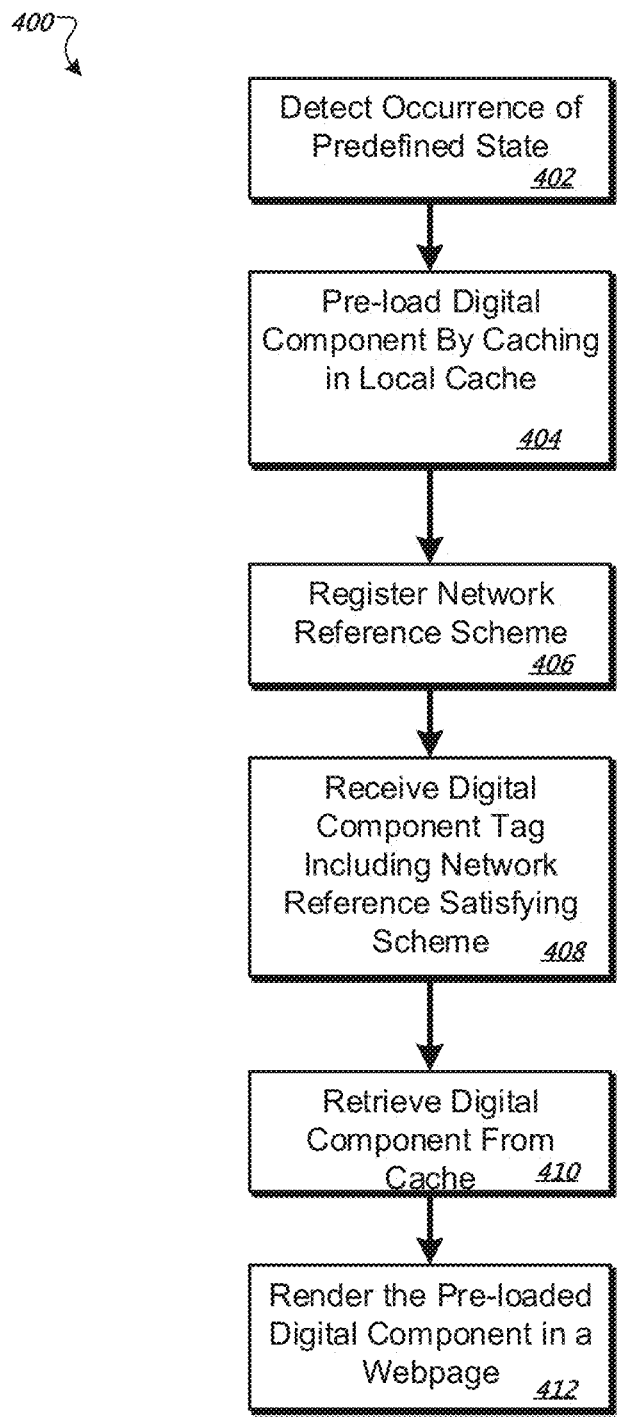

In some implementations, when the browser 360 requests the webpage data from the publisher system 365 associated with the request, the publisher system 365 receives the request and sends the webpage data to the browser 360 including digital component tags for digital component slots on the webpage. The browser 360 sends the digital component tags to the evaluation system parallel with rendering other portions of the webpage. The evaluation system runs the evaluation for the digital component tags received and responds by sending to the browser the network references and webpage data. The browser 360 sends the network reference to the registered application. Referring to FIG. 4, a content caching system (e.g., content caching system 102) executes process 400 in performing content caching. In operation, the content caching system detects (402) the occurrence of a predefined state of the content caching system, such as a trigger state or a download state, representing a desirable state to request digital components from a remote device (e.g., the content provider system 104) for pre-loading to the content caching system. The content caching system pre-loads (404) the digital component by requesting the digital component from the remote device, receiving the digital component from the remote device through a communication interface (e.g., interface 120) and caching the digital component in a local cache (e.g., local content cache 130). The content caching system registers (406) a network reference scheme for requesting the digital component from the cache. The content caching system receives (408) a digital component tag including a network reference that satisfies the registered network reference scheme. The content caching system, in response to receiving the digital component tag, retrieves (410) the digital component from the cache. The content caching system renders (412) the digital component in a webpage for presentation to a user of the content caching system.

Figure 5:
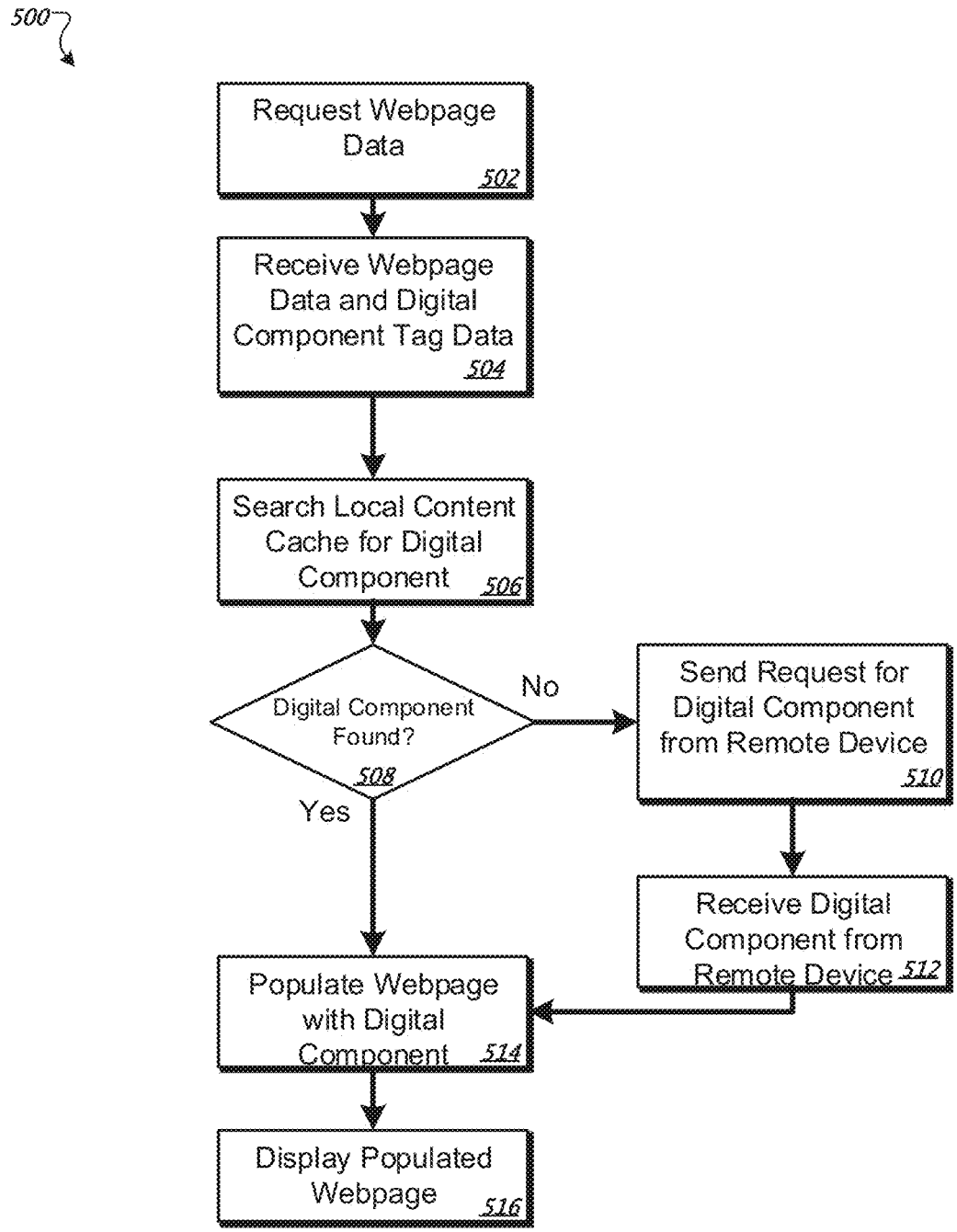

Referring to FIG. 5, a content caching system (e.g., content caching system 102 executes process 500 in caching content. In operation, the content caching system requests (502) webpage data from a remote device (e.g., publisher system 106). The content caching system receives (504) the webpage data and associated digital component tag data including a network reference to a digital component. The content caching system searches the local content cache (e.g., local content cache 130) for the digital component. The content caching system makes a determination (508) whether the digital component has been cached in the local content cache. If the digital component is found, the webpage is populated (514) with the digital component and the webpage is displayed (516). However, if the digital component is not found, the content caching system sends (510) a request for the digital component from a remote device (e.g., publisher system 106). The content caching system receives (512) the digital component from the remote device and populates (514) the webpage with the digital component received from the remote device. The latency of displaying the webpage using the pre-loaded digital component is reduced relative to a latency in displaying the webpage by receiving the digital component from the remote device in response to a request to view the webpage. In some implementations, the digital component is a video, which can cause the latency when being downloaded from the remote device due to data transfer time. In some implementations, reducing the latency includes reducing the delay between displaying the digital component and the other webpage data to less than 500 ms.

Figure 6:
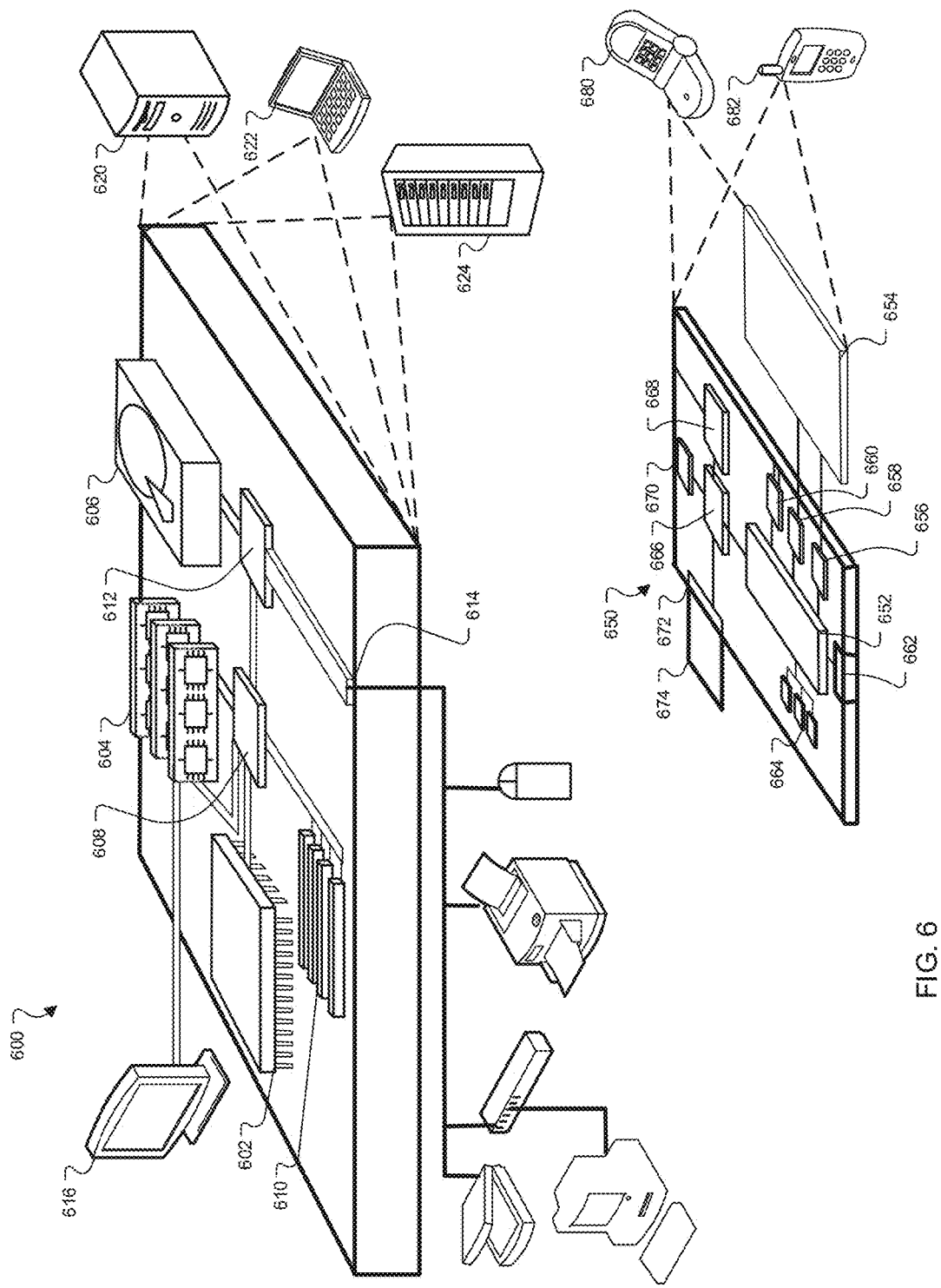
FIG. 6 is a block diagram of components of a content caching system.

Referring to FIG. 6, block diagram 601 shows example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 856 coupled to a display 654. The display 654 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 654 to present graphical and other information to a user. The control interface 658 may receive commands from a user and convert them for submission to the processor 652. In addition, an external interface 662 may be in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be a security module for device

650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the techniques described herein. For example, various forms of the flows shown above may be used, with steps re-ordered, added, or removed. Also, although several systems of content caching have been described, it should be recognized that numerous other systems are contemplated. Accordingly, other embodiments are within the scope of the following claims.

What is claimed is:

1. A content caching system for pre-loading digital components, the content caching system comprising:
   a communication interface configured to communicate with a remote device over a wireless network;
   a local content cache; and
   an evaluation system comprising one or more processors configured to perform operations comprising:
   responsive to detecting an occurrence of a predefined state for caching content, pre-loading a digital component for rendering in a browser at a time that is subsequent to a time of the pre-loading, with the pre-loading comprising:
      requesting the digital component from the remote device;
      receiving the digital component; and
      caching the digital component in the local content cache;

registering a scheme of a network reference for the cached digital component, with the scheme comprising a specified portion of the network reference for the cached digital component;

responsive to receiving a digital component tag comprising a network reference comprising a portion corresponding to the registered scheme:
retrieving, from the local content cache, the pre-loaded digital component associated with the digital component tag comprising the network reference; and
rendering, from the local content cache, the pre-loaded digital component in a graphical user interface rather than requesting the digital component from the remote device.

2. The content caching system of claim 1, wherein the scheme of the network reference specifies that the network reference is associated with an application on the content caching system and identifies the application as being configured to respond to a request for the pre-loaded digital component.

3. The content caching system of claim 1, wherein the graphical user interface includes a webpage, and wherein the operations further comprise:
receiving webpage data from a publisher system, the webpage data comprising a digital component tag for a digital component slot of the webpage;
in response to receiving the webpage data, requesting, from an evaluation system, a network reference for loading into the digital component tag to identify a digital component with which to populate the digital component slot of the webpage; and
receiving, from the evaluation system, the network reference for loading into the digital component tag, the network reference comprising a portion corresponding to the registered scheme.

4. The content caching system of claim 3, wherein receiving the network reference for loading into the digital component tag comprises:
receiving a first network reference comprising a uniform resource locator (URL) designating the remote device from which to load the digital component; and
receiving a second network reference comprising a portion of the network reference corresponding to the registered scheme.

5. The content caching system of claim 1, the operations further comprising:
responsive to receiving another digital component tag comprising another network reference, determining that the other network reference does not satisfy the network reference scheme;
determining whether another digital component associated with the other network reference is stored in the local content cache by comparing the other network reference to a list of known network references; and
in response to a determination that the other digital component is stored at the local content cache, retrieving, from the local content cache, the other digital component associated with the other network reference.

6. The content caching system of claim 1, wherein the digital component is rendered from video data, and wherein pre-loading the digital component from the remote device comprises downloading the video data from the remote device.

7. The content caching system of claim 1, wherein the predefined state comprises a determination that the wireless network is a local area network (LAN).

8. The content caching system of claim 1, wherein the digital component comprises an advertisement.

9. A method for pre-loading digital a component, the method comprising:
responsive to detecting an occurrence of a predefined state for caching content, pre-loading a digital component for rendering in a browser at a time that is subsequent to a time of the pre-loading, with the pre-loading comprising:
requesting the digital component from the remote device;
receiving the digital component; and
caching the digital component in a local content cache;
registering a scheme of a network reference for the cached digital component, with the scheme comprising a specified portion of the network reference for the cached digital component;
responsive to receiving a digital component tag comprising a network reference comprising a portion corresponding to the registered scheme:
retrieving, from the local content cache, the pre-loaded digital component associated with the digital component tag comprising the network reference; and
rendering, from the local content cache, the pre-loaded digital component in a graphical user interface rather than requesting the digital component from the remote device.

10. The method of claim 9, wherein the scheme of the network reference specifies that the network reference is associated with an application on the content caching system and identifies the application as being configured to respond to a request for the pre-loaded digital component.

11. The method of claim 9, wherein the graphical user interface includes a webpage, and further comprising:
receiving webpage data from a publisher system, the webpage data comprising a digital component tag for a digital component slot of the webpage;
in response to receiving the webpage data, requesting, from an evaluation system, a network reference for loading into the digital component tag to identify a digital component with which to populate the digital component slot of the webpage; and
receiving, from the evaluation system, the network reference for loading into the digital component tag, the network reference comprising a portion corresponding to the registered scheme.

12. The method of claim 11, wherein receiving the network reference for loading into the digital component tag comprises:
receiving a first network reference comprising a uniform resource locator (URL) designating the remote device from which to load the digital component; and
receiving a second network reference comprising a portion of the network reference corresponding to the registered scheme.

13. The method of claim 9, further comprising:
responsive to receiving another digital component tag comprising another network reference, determining that the other network reference does not satisfy the network reference scheme;
determining whether another digital component associated with the other network reference is stored in the local content cache by comparing the other network reference to a list of known network references; and
in response to a determination that the other digital component is stored at the local content cache, retrieving, from the local content cache, the other digital component associated with the other network reference.

14. The method of claim 9, wherein the digital component is rendered from video data, and wherein pre-loading the digital component from the remote device comprises downloading the video data from the remote device.

15. The method of claim 9, wherein the predefined state comprises a determination that the wireless network is a local area network (LAN).

16. The method of claim 9, wherein the digital component comprises an advertisement.

17. One or more non-transitory machine-readable media comprising instructions that are executable to perform operations comprising:
  responsive to detecting an occurrence of a predefined state for caching content, pre-loading a digital component for rendering in a browser at a time that is subsequent to a time of the pre-loading, with the pre-loading comprising:
    requesting the digital component from the remote device;
    receiving the digital component; and
    caching the digital component in a local content cache;
  registering a scheme of a network reference for the cached digital component, with the scheme comprising a specified portion of the network reference for the cached digital component;
  responsive to receiving a digital component tag comprising a network reference comprising a portion corresponding to the registered scheme:
    retrieving, from the local content cache, the pre-loaded digital component associated with the digital component tag comprising the network reference; and
    rendering, from the local content cache, the pre-loaded digital component in a graphical user interface rather than requesting the digital component from the remote device.

18. The one or more non-transitory machine-readable media claim 17, wherein the scheme of the network reference specifies that the network reference is associated with an application on the content caching system and identifies the application as being configured to respond to a request for the pre-loaded digital component.

19. The one or more non-transitory machine-readable media of claim 17, wherein the graphical user interface includes a webpage, and wherein the operations further comprise:
  receiving webpage data from a publisher system, the webpage data comprising a digital component tag for a digital component slot of the webpage;
  in response to receiving the webpage data, requesting, from an evaluation system, a network reference for loading into the digital component tag to identify a digital component with which to populate the digital component slot of the webpage; and
  receiving, from the evaluation system, the network reference for loading into the digital component tag, the network reference comprising a portion corresponding to the registered scheme.

20. The one or more non-transitory machine-readable media of claim 19, wherein receiving the network reference for loading into the digital component tag comprises:
  receiving a first network reference comprising a uniform resource locator (URL) designating the remote device from which to load the digital component; and
  receiving a second network reference comprising a portion of the network reference corresponding to the registered scheme.

21. The one or more non-transitory machine-readable media of claim 17, the operations further comprising:
  responsive to receiving another digital component tag comprising another network reference, determining that the other network reference does not satisfy the network reference scheme;
  determining whether another digital component associated with the other network reference is stored in the local content cache by comparing the other network reference to a list of known network references; and
  in response to a determination that the other digital component is stored at the local content cache, retrieving, from the local content cache, the other digital component associated with the other network reference.

22. The one or more non-transitory machine-readable media of claim 17, wherein the digital component is rendered from video data, and wherein pre-loading the digital component from the remote device comprises downloading the video data from the remote device.

23. The one or more non-transitory machine-readable media of claim 17, wherein the predefined state comprises a determination that the wireless network is a local area network (LAN).

24. The one or more non-transitory machine-readable media of claim 17, wherein the digital component comprises an advertisement.

25. A content caching system comprising:
  a communication interface configured to communicate with a remote device over a wireless network;
  a local content cache; and
  means for pre-loading a digital component for rendering in a browser at a time that is subsequent to a time of the pre-loading, responsive to detecting an occurrence of a predefined state for caching content, with the pre-loading comprising:
    means for requesting the digital component from the remote device;
    means for receiving the digital component; and
    means for caching the digital component in a local content cache;
  means for registering a scheme of a network reference for the cached digital component, with the scheme comprising a specified portion of the network reference for the cached digital component;
  responsive to receiving a digital component tag comprising a network reference comprising a portion corresponding to the registered scheme:
    means for retrieving, from the local content cache, the pre-loaded digital component associated with the digital component tag comprising the network reference; and
    means for rendering, from the local content cache, the pre-loaded digital component in a graphical user interface rather than requesting the digital component from the remote device.

* * * * *

UNITED STATES PATENT AND TRADEMARK OFFICE
CERTIFICATE OF CORRECTION

| | | |
|---|---|---|
| PATENT NO. | : 10,129,362 B2 | Page 1 of 1 |
| APPLICATION NO. | : 15/240876 | |
| DATED | : November 13, 2018 | |
| INVENTOR(S) | : Tuna Toksoz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this
Fourteenth Day of May, 2019

Andrei Iancu
*Director of the United States Patent and Trademark Office*